United States Patent [19]

Aoki et al.

[11] Patent Number: 5,216,994
[45] Date of Patent: Jun. 8, 1993

[54] FUEL INJECTION SYSTEM FOR INTERNAL COMBUSTION ENGINE

[75] Inventors: Narutoshi Aoki, Mishima; Yutaka Inaba, Numazu; Yoshinobu Arakawa, Numazu; Tsuneaki Endou, Numazu; Ryuji Satsukawa, Shimizu, all of Japan

[73] Assignee: Kokusan Denki Co., Ltd., Shizuoka, Japan

[21] Appl. No.: 861,287

[22] Filed: Mar. 31, 1992

[30] Foreign Application Priority Data

Feb. 3, 1992 [JP] Japan ................. 4-3472[U]

[51] Int. Cl.⁵ ............................................. F02M 51/00
[52] U.S. Cl. ................................. 123/490; 123/149 R
[58] Field of Search .......... 123/149 R, 149 A, 149 D, 123/478, 479, 490, 599

[56] References Cited

U.S. PATENT DOCUMENTS

| | | | |
|---|---|---|---|
| 4,690,118 | 9/1987 | Hofbauer et al. | 123/533 |
| 4,901,704 | 2/1990 | Safranek | 123/149 D |
| 5,090,386 | 2/1992 | Kurosu et al. | 123/478 |

*Primary Examiner*—Tony M. Argenbright
*Attorney, Agent, or Firm*—Pearne, Gordon, McCoy & Granger

[57] ABSTRACT

A fuel injection system for an internal combustion engine capable of being normally operated while using an output of a generator driven by the internal combustion engine as a power supply therefor. The system includes a switching circuit for switching a driving current fed to an injector from a main power circuit which uses the output of the generator as a power supply therefor. The switching circuit is controlled by a switch control circuit for which a power supply comprises a control power circuit. The control power circuit includes a storage unit for storing electric power therein, so that the storage unit may be act as a power supply when the output of the main power circuit is reduced, to thereby feed the switch control circuit with a power supply voltage of a level equal to or above an operable level. The storage unit is charged by the output of the main power circuit or an output of a generating coil for a control power supply provided in the generator in a manner to be separate from a generating coil for the main power supply.

8 Claims, 3 Drawing Sheets

FUEL INJECTION SYSTEM FOR INTERNAL COMBUSTION ENGINE

BACKGROUND OF THE INVENTION

This invention relates to a fuel injection system for an internal combustion engine, and more particularly to a fuel injection system which is adapted to use, as a power supply therefor, a generator driven by an internal combustion engine, to thereby feed a fuel to the internal combustion engine.

An internal combustion engine which has been used in the art generally employs, for the purpose of accurately controlling feed of fuel thereto, a fuel injection system which includes an injector for rendering a needle valve open to inject fuel therethrough while a driving current or exciting current is being fed thereto and a circuit for controlling the injector. In such a fuel injection system, a battery arranged in a vehicle, a ship or the like in which the internal combustion engine is mounted is generally used as a power supply for drive, as seen in, for example, U.S. Pat. No. 4,690,118.

Recently, it has been desired to apply such a fuel injection system to an internal combustion engine used for an equipment in which no battery is mounted such as an outboard motor or the like as well. In this instance, a generator mounted on the internal combustion engine would be used as a power supply for the fuel injection system.

Use of a generator as a power supply for the fuel injection system permits feeding of fuel to the engine to be smoothly accomplished, so long as the engine speed is sufficiently increased and the generator generates an enough output. However, when the engine speed does not fail to be increased to such a sufficient level and the output of the generator is kept at a low level, a voltage applied to a switch control circuit for controlling a switching circuit adapted to control an exciting current flowing through an exciting coil of the injector is reduced below a level which renders operation of the switch control circuit possible, resulting in the switching circuit being often interrupted. Such interruption of the switching circuit causes the injector to stop fuel injection, so that the amount of fuel fed to the engine is insufficient, to thereby render operation of the engine at the time of a low engine speed, particularly, at the time of starting unstable.

SUMMARY OF THE INVENTION

The present invention has been made in view of the foregoing disadvantage of the prior art.

Accordingly, it is an object of the present invention to provide a fuel injection system for an internal combustion engine which is capable of effectively using, as a power supply therefor, a generator driven by the engine and positively preventing the amount of fuel fed to the engine at the time of a low engine speed from being insufficient.

It is another object of the present invention to provide a fuel injection system for an internal combustion engine which is capable of preventing shortage of fuel fed to the engine at the time of a low engine speed with a simple structure.

It is a further object of the present invention to provide a fuel injection system for an internal combustion engine which is capable of permitting a storage means to be positively charged.

In accordance with the present invention, a fuel injection system for an internal combustion engine is provided. The fuel injection system generally includes a main power circuit arranged for using, as a power supply therefor, an output of a generator driven by the internal combustion engine; an injector for injecting fuel for a period of time during which it is fed with a current from the main power circuit; a switching circuit arranged so as to switch a current fed from the main power circuit to the injector and be turned on for a period of time during which it is fed with a trigger signal, to thereby permit the current to be fed from the main power circuit to the injector; a switch control circuit for feeding the switching circuit with the trigger signal of a predetermined time width when it is fed with a fuel injection command signal; and a control power circuit for applying the power supply voltage to a power terminal of the switch control circuit. The switch control circuit is rendered operable for a period of time during which a power supply voltage of a predetermined operable level or more is applied to the power terminal, to thereby generate the trigger signal for a period of time during which the fuel injection command signal is fed thereto. The control power circuit includes a storage means for storing electrical power therein, so that it may serve as a power supply when an output of the main power circuit is reduced, so that the power supply voltage of the operable level or more is applied to the switch control circuit. The storage means may comprise a capacitor charged by the output of the main power circuit or a small-sized secondary battery.

The above-described arrangement of the storage means at the control power circuit permits the power supply voltage of the operable level or more to be fed from the storage means to the switch control circuit, so that the injector may be operated even when the output of the generator is reduced at the time of a low engine speed, to thereby ensure that a sufficient amount of fuel may be fed to the engine all the time.

Alternatively, the present invention may be so constructed that the generator is provided therein with a generating coil for a control power supply separate from a generating coil for the main power supply, to thereby permit the storage means to be charged by the generating coil for the control power supply. In such construction, the output of the generating coil for the control power supply is rectified through a rectifier and then fed to the storage means. When the control power circuit uses the generating coil for the control power supply as a power supply therefor, use of a coil having a sufficient number of windings as the generating coil for the control power supply permits the injector to be effectively operated at the time of a low engine speed as well, to thereby prevent the amount of fuel fed to the engine from being insufficient at the time of a low engine speed.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a fuel injection system for an internal combustion engine will be described hereinafter with reference to the accompanying drawing.

Figure 1:
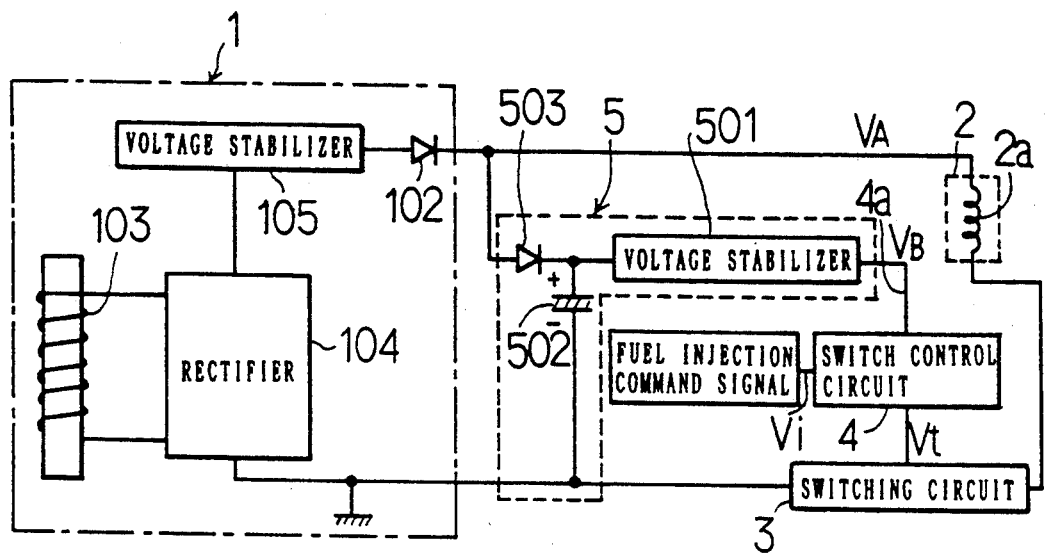
FIG. 1 is a circuit diagram showing an electrical structure of an embodiment of a fuel injection system for an internal combustion engine according to the present invention.

FIG. 1 shows an embodiment of a fuel injection system for an internal combustion engine according to the present invention. A fuel injection system of the illustrated embodiment generally includes a main power circuit 1, an injector 2 including an excitation coil 2a and adapted to inject fuel for a period of time during which an exciting current is fed from the main power circuit 1 to the excitation coil 2a, a switching circuit 3 provided for switching the exciting current fed from the main power circuit 1 to the excitation coil 2a of the injector 2 and kept turned on or conductive for a period of time during which a trigger signal Vt is fed thereto, to thereby permit the exciting current to be fed to the injector 2, a switch control circuit 4 for feeding the trigger signal Vt to the switching circuit 3 when a fuel injection command signal Vi is fed thereto, and a control power circuit 5 for applying a power supply voltage to a power terminal 4a of the switch control circuit 4. The switch control circuit 4 is rendered operative for a length of time during which a power supply voltage of a predetermined operable level Vo or more is applied to the power terminal 4a of the switch control circuit 4, to thereby generate the trigger signal Vt of a predetermined time width.

The main power circuit 1 includes a diode 102, a generating coil 103 arranged in an AC magneto mounted on the internal combustion engine, a rectifier 104 for rectifying an output of the generating coil 103 to convert it into a DC voltage, and a voltage stabilizer 105 for restricting the output voltage of the rectifier 104 to a predetermined level. In the illustrated embodiment, the voltage stabilizer 105 generates a voltage equal to the output voltage of the rectifier 104 when the output voltage of the rectifier 104 is at a predetermined level or below and generates a voltage of the predetermined level when the output voltage is at the predetermined level or above.

The control power circuit 5 includes a voltage stabilizer 501 for which a power supply comprises the main power circuit 1, a capacitor 502 and a diode 503. The voltage stabilizer 501 generates a voltage of a predetermined level when a voltage across the capacitor 502 is at the predetermined level or more and generates a voltage equal to the voltage across the capacitor 502 when it is below the predetermined level. The voltage stabilizer 501 is provided for the purpose of protecting the circuit elements against an overvoltage. The voltage across the capacitor 502 is applied through the voltage stabilizer 501 to the power terminal 4a of the switch control circuit 4. In the illustrated embodiment, the capacitor 502 constitutes a storage means.

The switch control circuit 4 feeds a trigger signal Vt of a predetermined time width to the switching circuit 3 when it is fed with the injection command signal Vi such as a signal in the form of, for example, a pulse-like shape or a rectangular shape, so that the switching circuit 3 is kept open for a period of time during which the trigger signal Vt is fed to the switching circuit 3, to thereby cause a driving current or exciting current to flow to the injector 2. The injector 2 keeps a needle valve open while the driving current flows through the injector 2, so that fuel is injected into a fuel injection space of the engine such as, for example, an inlet manifold. Thus, the amount of fuel fed to the engine is determined depending on the time width of the trigger signal $V_t$. The switch control circuit 4 controls the time width of the trigger signal Vt depending on various conditions such as the engine speed, a temperature and the like in order to permit the engine to be operated under optimum conditions.

Figure 2:
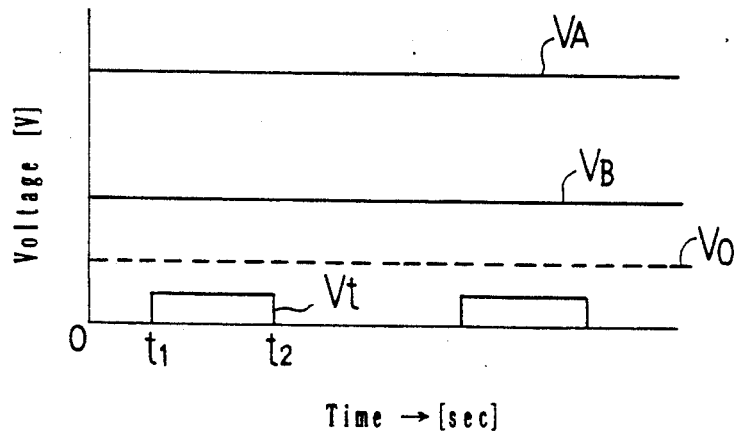
FIG. 2 is a wave form chart showing a voltage wave form of each part of the system shown in FIG. 1 at the time of a high engine speed.

The illustrated embodiment is so constructed that when the engine speed is increased to a certain degree of level or above and the output voltage of the generating coil 103 is at a sufficient level, the control power circuit 5 generates a constant voltage $V_B$ above the operable level Vo, as shown in FIG. 2. At this time, feeding of the trigger signal to the switching circuit 3 is smoothly continued without any interruption, to thereby ensure that the injector 2 continues satisfactory operation for a period of injection time ta designated by the trigger signal Vi. In FIG. 2, reference character $V_A$ designates an output voltage of the main power circuit 1, Vo is an operable level which permits the switch control circuit 4 to be operable, t1 is time at which the valve of the injector is rendered open to start fuel injection or time at which the injection command signal Vi is fed to the switch control circuit 4, and t2 is time at which the valve of the injector is closed to stop the fuel injection.

Figure 3:
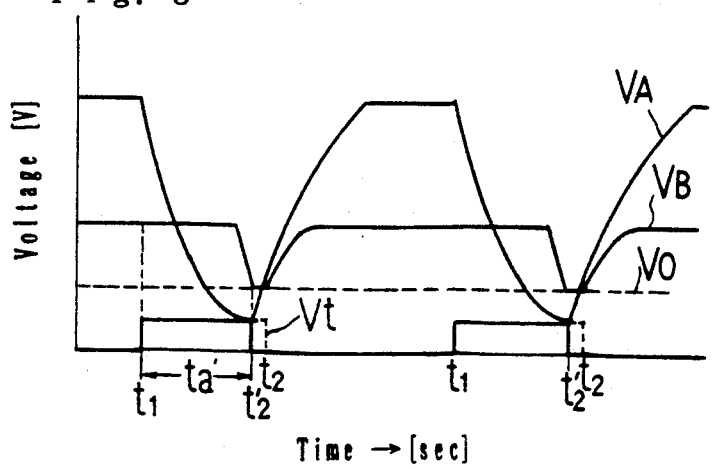
FIG. 3 is a wave form chart schematically showing a voltage wave form of each part of the system shown in FIG. 1 at the time of a low engine speed.

FIG. 3 clearly indicates that when the injection command signal Vi is fed to the switch control circuit 4 to cause the switch control circuit 4 to feed the trigger signal Vt to the switching circuit 3 under the conditions that the engine speed is kept at a low level and the output of the generating coil 103 is insufficient, a current starts to flow to the injector 2 to cause a decrease in output of the generating coil 103 to start, leading to a decrease in output voltage $V_A$ of the main power circuit 1. This causes the voltage applied from the main power circuit 1 to the control power circuit 5 to be likewise reduced, however, the illustrated embodiment provides the control power circuit 5 with the capacitor 502 acting as the storage means to permit a current to be fed from the capacitor 502 to the switch control circuit 4, resulting in a decrease in power supply voltage $V_B$ applied to the power terminal 4a of the control switch circuit 4 being started with a delay. This permits the power supply voltage $V_B$ to be kept at a level equal to or above the operable level $V_O$ until original injection terminating time t2 or until time t2' near the time t2. Therefore, the switching circuit 3 is fed with the trigger signal $V_t$ at least until the time t2' near the original injection terminating time t2 after the switch control circuit 4 is fed with the injection command signal Vi at the time t1, during which the injector is normally operated to feed the engine with fuel.

As can be seen from the foregoing, the illustrated embodiment is so constructed that the control power circuit 5 is provided with the storage means, to thereby permit the power supply voltage of the operable level or more to be fed from the control power circuit to the switch control circuit even when the output of the generator is reduced. Such construction reduces a period of time during which the injector operates at the time of a low engine speed, to thereby prevent the amount of fuel fed from being insufficient. This permits a generator driven by the engine to be effectively used as a power supply for the fuel injection system and ensures that the fuel injection system accomplishes stable operation at the time of a low engine speed as well. Thus, it will be noted that the fuel injection system of the illustrated embodiment permits a generator driven by the internal combustion engine to be used as a power supply for the system and operation of the injection system to be stably performed, resulting in being effectively applied to an internal combustion engine which is not provided with any battery.

Figure 4:
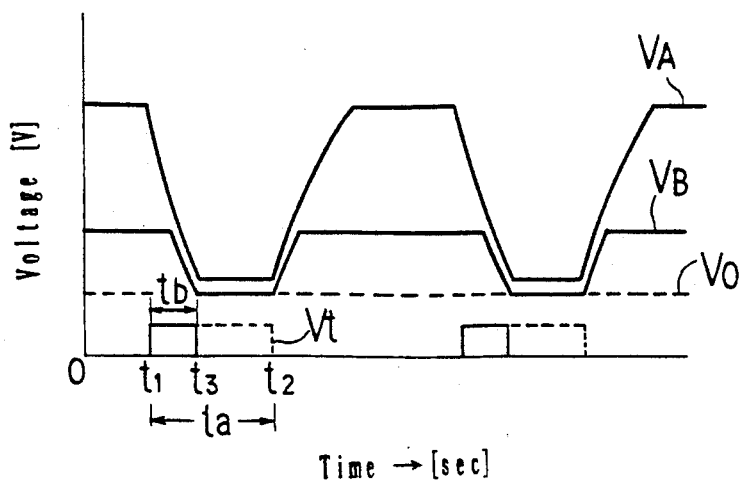
FIG. 4 is a wave form chart schematically showing a voltage wave form of each part of the system shown in FIG. 1 at the time of a low engine speed wherein a storage means is not provided.

Supposing that the capacitor 502 is not provided, when the switching circuit 3 is turned on to cause a driving current to start to flow through the injector 2 because an impedance of the injector is considerably low, a voltage between the output terminals of the main power circuit 1 (a voltage across a series circuit of the injector 2 and switching circuit 3) is substantially reduced, so that a voltage applied to the control power circuit 5 and a voltage applied to the power terminal 4a of the switch control circuit 4 are decreased correspondingly. When the engine speed is kept fully high and the output of the generating coil 103 is at a sufficient level, the voltage stabilizer 105 is permitted to generate the voltage $V_A$ of a substantially constant level and the voltage stabilizer 501 is permitted to generate the voltage $V_B$ of a substantially constant level equal to or above the operable level Vo of the switch control circuit 4 as in the waveforms shown in FIG. 2, so that feeding of fuel may be smoothly carried out. On the contrary, in the case that the engine speed is kept low and the output of the generating coil 103 is low, the switch control circuit 4 feeds the switching circuit 3 with the trigger signal Vt to permit the switching circuit 3 to be conductive when it is fed with the injection command signal Vi, resulting in the output $V_A$ of the main power circuit 1 to be reduced with an increase in a load current of the main power circuit 1 as shown in FIG. 4, to thereby cause the output voltage $V_B$ of the control power circuit 5 to be likewise reduced. This often causes the output voltage $V_B$ of the control power circuit 5 to be decreased below the operable level Vo of the switch control circuit 4 at time t3 considerably earlier than the time t2 at which fuel injection is to be stopped, after the switch control circuit 4 is fed with the injection command signal Vi. At this time, a time width tb of the trigger signal Vt is highly reduced as compared with a time width of an original trigger signal as indicated at dotted lines in FIG. 4. Such situation leads to stopping of feeding of the trigger signal Vt at the time t3 considerably prior to the time t2 at which fuel injection is to be stopped to render the switching circuit 3 turned off, so that the injector 2 interrupts the injection of fuel to restrict fuel injection to time tb considerably reduced as compared with the time ta originally required. This renders the amount of fuel to be fed to the engine insufficient, so that operation of the engine at a low speed, particularly, the starting operation is made unstable. The illustrated embodiment eliminates such a disadvantage because of using a capacitor as the storage means.

In the embodiment described above, as the storage means is used a capacitor charged by the main power circuit 1. Alternatively, a battery 505 charged through a diode 503 may be used as the storage means in place of the capacitor, as in an embodiment shown in FIG. 5. Such construction of the embodiment of FIG. 5 permits a switch control circuit 4 to be fed a power supply voltage of an operable level or more irrespective of an output of a generator, to thereby ensure smooth operation of an injector at the time of a low engine speed as well.

Figure 5:
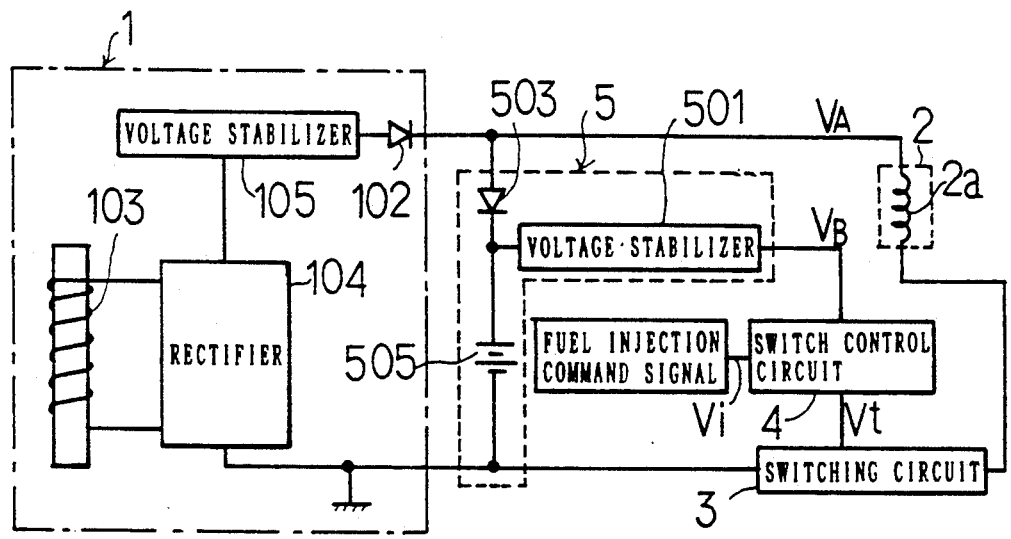
FIG. 5 is a circuit diagram showing another embodiment of a fuel injection system for an internal combustion engine according to the present invention.

The battery 505 used in the embodiment of FIG. 5 may comprise a small-sized battery such as a nickel-cadmium battery or the like, so that the embodiment may be readily applied to a device which is not originally provided with a battery.

In each of the embodiments described above, the storage means is charged by an output of the main power circuit 1. Alternatively, the present invention may be constructed as in an embodiment shown in FIG. 6, wherein a generating coil 506 for a control power supply is provided in a magneto in a manner to be separate from a generating coil 103 for a main power supply, so that an output of the generating coil 506 may be fed to a rectifier 507, of which an output is utilized to charge a capacitor 502 acting as a storage means. The generating coil 506 has a sufficient number of windings so that it may generate a voltage equal to or above an operable level of a switch control circuit 4 at the time of a low engine speed as well.

Figure 6:
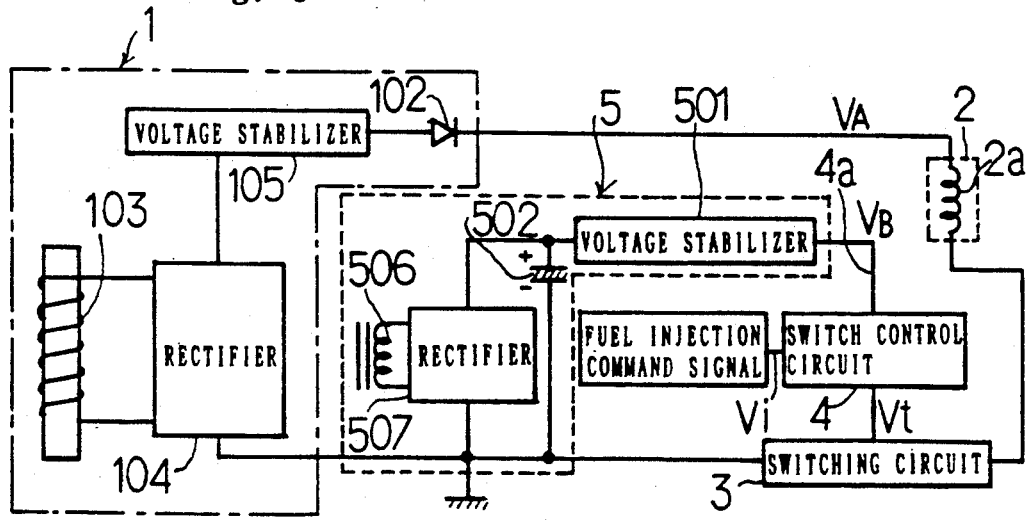
FIG. 6 is a circuit diagram showing a further embodiment of a fuel injection system for an internal combustion engine according to the present invention.
Figure 7:
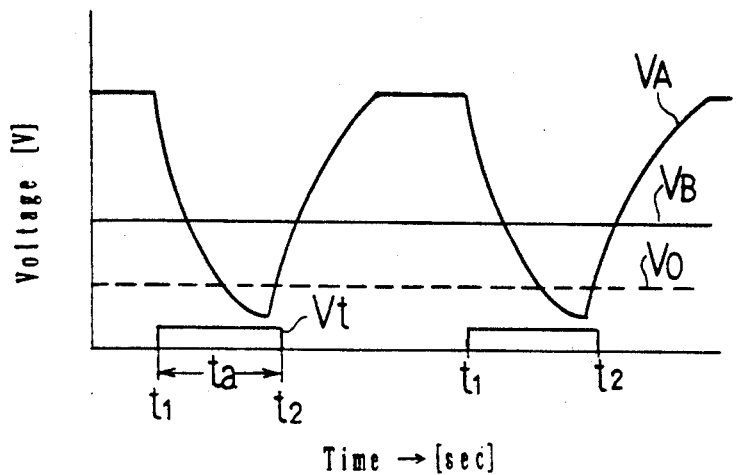
FIG. 7 is a wave form chart schematically showing a voltage wave form of each part of the system shown in FIG. 6 at the time of a low engine speed.

In the embodiment of FIG. 6, when the switch control circuit 4 is fed with an injection command signal Vi at time t1 to cause the switch control circuit 4 to feed a switching circuit 3 with a trigger signal Vt under the conditions that the engine speed is kept low and the output of the generating coil 103 is insufficient, a current starts to flow through an injector 2. This causes a decrease in output of the generating coil 103 to start, so that an output voltage VA of a main power circuit 1 is reduced as shown in FIG. 7. However, the generating coil 506 provided separate from the generating coil 103 is used as a power supply for a control power circuit 5, therefore, an output voltage of the control power circuit 5 is kept at a substantially constant level $V_B$ above the operable level Vo. Thus, the illustrated embodiment permits the control power circuit 5 to continue to generate a voltage of a level equal to or above the operable level at the time of a low engine speed as well, so that the switch control circuit 4 may feed the switching circuit 3 with the trigger signal Vt until original injection terminating time t2 after it is fed with the injection command signal at time t1, to thereby normally operate the injector 2 to provide an engine with fuel.

Figure 8:
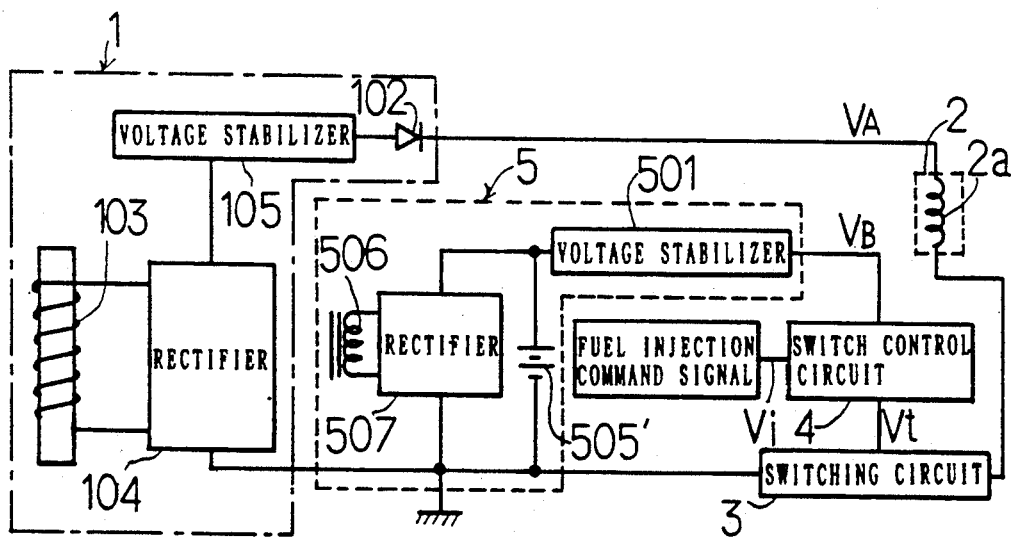
FIG. 8 is a circuit diagram showing still another embodiment of a fuel injection system for an internal combustion engine according to the present invention.

The embodiment of FIG. 6, as described above, is so constructed that the capacitor 502 is connected to an output terminal of the rectifier 507, resulting in being charged. Alternatively, the present invention may be constructed in such a manner as shown in FIG. 8, which illustrates a further embodiment of the present invention. More specifically, a rechargeable battery 505' is connected to an output terminal of a rectifier 507 to charge the battery by means of an output of a generating coil 506. Such construction permits a switch control circuit 4 to be fed with a power supply voltage equal to or above an operable level of the circuit 4 irrespective of the output of the generating coil 506, to thereby smoothly operate an injector at even a low engine speed.

Each of the above-described embodiments is provided with the voltage stabilizers 105 and 501, however, such voltage stabilizers may be eliminated when the circuit elements possess voltage withstanding properties.

Also, in each of the embodiments described above, a D.C. power circuit is used as the main power circuit 1, However, fuel injection time is equal to or below a half wave (½ cycle) of an AC output of the generating coil 103 over a whole engine speed region and the switching circuit 3 comprises a unidirectional switching element capable of enduring a reverse voltage (or, for example, the switching element comprises an NPN transistor switch and the base-emitter of the transistor are sufficient to endure a negative-directional voltage of an AC voltage generated from the generating coil), the rectifier 104 may be eliminated from the main power circuit 1, resulting in only the generating coil 103 constituting the main power circuit 1.

Moreover, the embodiments described above each use an AC generator as the power supply for the main power circuit. However, a DC generator may be suitably used for this purpose as well.

As can be seen from the foregoing, the fuel injection system of the present invention is so constructed that the control power circuit is provided with the storage means which functions to feed the switch control circuit with a power supply voltage of a level equal to or above the operable level; therefore, the injector is satisfactorily operated even when an output of the generator is reduced at the time of a low engine speed, to thereby ensure that a sufficient amount of fuel is fed to the engine at the time of a low engine speed as well.

Thus, the fuel injection system of the present invention can be effectively applied to an internal combustion engine which is not provided with a battery.

While preferred embodiments of the invention have been described with a certain degree of particularity with reference to the drawings, obvious modifications and variations are possible in light of the above teachings. It is therefore to be understood that within the scope of the appended claims, the invention may practiced otherwise as specifically described.

What is claimed is:

1. A fuel injection system for an internal combustion engine comprising:
    a main power circuit arranged for using, as a power supply therefor, an output of a generator driven by the internal combustion engine;
    an injector for injecting fuel for a period of time during which it is fed with a current from said main power circuit;
    a switching circuit turned on for a period of time during which it is fed with a trigger signal, to thereby permit said current to be fed from said main power circuit to said injector;
    a switch control circuit for feeding said switching circuit with said trigger signal of a predetermined time width when it is fed with a fuel injection command signal;
    said switch control circuit being rendered operable for a period of time during which a power supply voltage of at least a predetermined operable level is applied to a power terminal thereof, to thereby generate said trigger signal for a period of time during which said fuel injection command signal is fed thereto; and
    a control power circuit for applying the power supply voltage of said predetermined operable level to said power terminal of said switch control circuit;
    said control power circuit including a storage means for storing electrical power therein, so that said storage means serves as a power supply when an output of said main power circuit is reduced, to thereby apply the power supply voltage of said operable level to said switch control circuit.

2. A fuel injection system as defined in claim 1, wherein said storage means comprises a capacitor charged by the output of said main power circuit.

3. A fuel injection system as defined in claim 1, wherein said storage means comprises a battery.

4. A fuel injection system as defined in claim 1, wherein said control power circuit includes a voltage stabilizer.

5. A fuel injection system for an internal combustion engine comprising:
    a main power circuit arranged for using, as a power supply therefor, a generating coil for a main power supply provided in a generator driven by the internal combustion engine;
    an injector for injecting fuel for a period of time during which it is fed with a current from said main power circuit;
    a switching circuit turned on for a period of time during which it is fed with a trigger signal, to thereby permit said current to be fed from said main power circuit to said injector;
    a switch control circuit for feeding said switching circuit with said trigger signal of a predetermined time width when it is fed with a fuel injection command signal;
    said switch control circuit being rendered operable for a period of time during which a power supply voltage of at least a predetermined operable level is applied to a power terminal thereof, to thereby generate said trigger signal for a period of time during which said fuel injection command signal is fed thereto; and
    a control power circuit for applying the power supply voltage of said predetermined operable level to said power terminal of said switch control circuit;
    said control power circuit including a generating coil for a control power supply provided in said generator in a manner to be separate from said generating coil for said main power supply a storage means charged by said generating coil for the control power supply, so that a charged voltage of said storage means permits the power supply voltage of said operable level to be applied to said switch control circuit when an output of said generating coil for the control power circuit is reduced.

6. A fuel injection system as defined in claim 5, including a rectifier connected between said generator coil and said storage means wherein the output of said generating coil for the control power supply is rectified through said rectifier, and thereafter fed to said storage means.

7. A fuel injection system as defined in claim 6, wherein said said storage means comprises a capacitor.

8. A fuel injection system as defined in claim 6, wherein said storage means comprises a secondary battery.

* * * * *